United States Patent [19]

Ehrat

[11] 4,361,757
[45] Nov. 30, 1982

[54] CARD-LIKE DATA CARRIER

[75] Inventor: Kurt Ehrat, Steinmaur, Switzerland

[73] Assignee: Zeag Systems AG, Schlieren, Switzerland

[21] Appl. No.: 224,437

[22] Filed: Jan. 12, 1981

[30] Foreign Application Priority Data

Jan. 12, 1980 [CH] Switzerland ............................ 207/80

[51] Int. Cl.³ .......................... G06K 5/00; G06K 7/10; G06K 19/06
[52] U.S. Cl. .................................... 235/487; 235/380; 235/473; 235/491
[58] Field of Search ............... 235/380, 473, 487, 491; 340/825.31, 825.33, 825.34, 825.35

[56] References Cited

U.S. PATENT DOCUMENTS 4,138,057  2/1979  Atalla .................................. 235/473

Primary Examiner—Harold I. Pitts
Attorney, Agent, or Firm—Kontler, Grimes & Battersby

[57] ABSTRACT

An imitation-proof card-like data carrier which permits light to pass through a large number of light-conducting elements each having a light-admitting inlet portion, a light-discharging outlet portion which is laterally offset relative to the inlet portion, and a light-conducting intermediate portion with two reflecting surfaces, one adjacent to the inlet portion and the other adjacent to the outlet portion. The information which is stored in or denoted by an element is characterized by the distance between the inlet and outlet portions as well as on the inclination of that reflecting surface which directs light into the outlet portion. The light rays issuing from the outlet portions of the elements impinge upon selected photodiodes of an array of photodiodes in an apparatus into which the data carrier is inserted to ascertain the genuineness thereof, to ascertain the identity of the bearer, to cancel certain elements if each element represents a sum of money and/or for other purposes.

24 Claims, 12 Drawing Figures

CARD-LIKE DATA CARRIER

CROSS-REFERENCE TO RELATED CASE

A data carrier card which is somewhat similar to the data carrier of the present invention is disclosed in the commonly owned copending application Ser. No. 223,848 filed Jan. 9, 1981 for "Data Carrier Card".

BACKGROUND OF THE INVENTION

The present invention relates to data carriers in general, and more particularly to improvements in card-like data carriers. Still more particularly, the invention relates to improvements in flat card-like data carriers for storage of information which can be decoded by automatic decoding machines or readers and can be used as identification cards, credit cards, money substitute cards, time recording cards or for analogous purposes.

It is well known to utilize data carriers in the form of cards as a means for gaining access to restricted areas, as identification cards, as credit cards or the like. Such cards contain information which can be decoded by machines, e.g., by readers wherein the card is introduced into a slot for examination by automatic scanning or decoding equipment.

A card which is used as a substitute for cash contains a plurality of discrete data or bits of information each of which denotes a particular sum of money. A fresh or unused card stores information denoting the maximum selected sum of money, e.g., the sum of one hundred dollars. Such information consists of several discrete data or bits of information each of which denotes a smaller sum of money, e.g., one dollar. In other words, the total information on an unused card which serves as a substitute for cash is divisible into a given number of identical data each denoting a corresponding fraction of the maximum sum of money which is represented by the entire information on the unused card. Each of such plurality of data is assigned a discrete portion or area on the card, and each discrete portion can be treated to erase or cancel the information which is stored therein. The erasure or cancellation of information on discrete areas is effected at a testing or examining station and is equivalent to cash payment of the corresponding sum of money. The card is useless and can be discarded as soon as the erasure or cancellation of information on the last discrete portion is completed.

A card of the just outlined character cannot be used as a means for identifying the bearer if it is printed or otherwise manufactured in large numbers and each of such a large number of cards contains identical information, e.g., if each card can serve as a substitute for the same amount of money. Therefore, it is often desirable to issue individualized cards each of which stores information denoting a certain sum of money as well as additional information pertaining to the owner or authorized user or bearer of such card.

A time sheet or card can be used to record information pertaining to the times of the day, to the days of the week, etc. Such cards are insertable into suitable machines (e.g., clocks) which encode the time of the day and/or the day of the week and/or other information which is indicative of the time when the card was provided with or relieved of information. The information is normally stored in a form which can be decoded by an automatic reader.

Each and every one of the above enumerated data carriers must satisfy at least some, and preferably all, of the following requirements:

First of all, a data carrier should be constructed and assembled with a view to ensure that it cannot be readily manufactured by unauthorized persons. If the data carriers are used in lieu of cash, the time, effort and equipment needed for reintroduction or reencoding of previously erased information which denotes a given sum or money must be more expensive than the sum of money which is denoted by the reencoded information. In other words, tampering with such data carriers for the purpose of encoding information denoting given sums of money must be sufficiently expensive to deter the would-be forgers from attempting to encode cancelled information.

Secondly, the data carrier must be of the type which is capable of being mass-produced at a relatively low cost, and the nature of information which is encoded therein or which is to be encoded therein must be such that the information can be encoded and/or decoded by resorting to relatively simple and inexpensive machinery. For example, when a data carrier is to be used as a substitute for a given sum of money, the machine which handles such data carriers at a counter or the like must be less expensive than the clerk or another employee who would be in charge of accepting or handing out sums of money in the absence of data carriers.

Still further, the methods and/or machines for the making of data carriers should be sufficiently complex and/or expensive to deter all would-be forgers or imitators from investing the necessary capital and/or time. This applies especially for data carriers which are used as substitutes for cash.

The following constitute but a few of presently known data carriers which fail to satisfy the above-enumerated requirements:

(a) Data carriers which are provided with magnetic tracks for storage of information thereon.

(b) Data carriers wherein the information is encoded in the form of holes or perforations.

(c) Data carriers of transparent synthetic plastic material with imprinted opaque (black) indicia.

(d) Data carriers with inductively readable non-visible metallic inserts.

(e) Carriers with printed conductor tracks, including carriers with tracks acting not unlike high-frequency resonators.

(f) Carriers with highly integrated circuits, for example, of the type disclosed in German Offenlegungsschrift No. 2,224,937.

(g) Data carriers which embody optical reflectors or reflecting zones, for example, of the type disclosed in German Offenlegungsschrift No. 2,659,639.

(h) Data carriers with information which constitutes a holograph. Data carriers of such type are disclosed in U.S. Pat. No. 3,643,216 granted Feb. 15, 1972 to Greenaway et al.

The data carriers (a) to (e) bear unidimensional or twodimensional information. Therefore, such data carriers can be readily copied by resorting to commercially available apparatus or machines. In other words, data carriers of the type (a), (b), (c), (d) and/or (e) can be readily falsified unless they are provided with additional means or are produced and/or treated in accordance with further techniques which prevent ready and inexpensive counterfeiting. One of such techniques involves the integration of a magnetic tape or strip into a data carrier which is provided with hard-to-copy data, i.e., with information which cannot be readily copied by forgers or cannot be copied at all. Data carriers with highly integrated circuits cannot be readily copied; however, their cost is extremely high. Data carriers which embody reflection zones or holographic information can be said to carry data in threedimensional form which cannot be readily copied by resorting to twodimensional copying equipment. Therefore, such data carriers cannot be readily forged. However, the cost of presently known data carriers bearing threedimensional information is often much too high for a number of uses so that the field of applications of such data carriers is rather limited.

OBJECTS AND SUMMARY OF THE INVENTION

An object of the invention is to provide a novel and improved carrier of encoded information which cannot be readily copied, falsified, forged and/or altered by unauthorized persons.

Another object of the invention is to provide a data carrier which can store substantial amounts of information in a small area and can be readily altered by authorized persons to modify the information which is encoded therein.

A further object of the invention is to provide a novel and improved multiple-purpose carrier of encoded information which can be used as a substitute for cash, as an identification card, as a time recording device and/or a combination of the above.

An additional object of the invention is to provide a data carrier which occupies little room, which can store several types of encoded information, which can store information that is capable of being decoded and/or altered in relatively simple and compact machines, and which can be used as a superior substitute for several heretofore known data carriers.

Another object of the invention is to provide the data carrier with novel and improved means for storing encoded information.

A further object of the invention is to provide the data carrier with novel and improved means for facilitating rapid and convenient modification (including erasure, cancellation, destruction and/or reshaping) of information which is encoded therein.

An additional object of the invention is to provide a compact data carrier which can be used to afford access to restricted areas, to pay debts, to open doors or gates, to identify the bearer, user or owner, to record increments or units of time or other information and/or to perform two or more of the just enumerated functions, and which is capable of indicating to the user or owner the amount or amounts of remaining information if the nature of information which is encoded therein is such that the amount of information or the space which is available for encoding of information dwindles with progressing use of the data carrier.

A further object of the invention is to provide a data carrier which cannot be readily reproduced in available copying or like machines.

Another object of the invention is to provide a flat card-like data carrier of the fact that it cannot be readily copied or altered by unauthorized persons.

The invention is embodied in a data carrier for storage of encoded machine-readable information such as amounts of money, various increments or units of time including times of the day, week, month, etc, and/or identifying indicia pertaining to the bearer. The data carrier comprises a flat card-like body and a plurality of light-conducting elements in the body. Each light-conducting element denotes a bit of information and has a light-admitting inlet portion, a light-discharging outlet portion which is offset with reference to the inlet portion (i.e., out of register with the inlet portion), and a light-reflecting and conducting median portion intermediate the inlet and outlet portions. The median portion conducts light from the inlet portion to the outlet portion of the respective element. The median portion of each light-conducting element has at least one light-reflecting surface and the inclination of such light-reflecting surface relative to the planes of the outer sides of the data carrier is the sole parameter or one of the parameters denoting the information which is represented by or stored in the respective elements. Another parameter is or can be the distance between the inlet and outlet portions of a light-conducting element, namely, the distance as measured in the plane of the card-like body (i.e., at right angles to the general plane of such body).

In accordance with a presently preferred embodiment of the invention, the median portion of each light-conducting element has two light-reflecting surfaces, namely, a first surface which reflects light entering by way of the inlet portion and a second reflecting surface which reflects light leaving the respective median portion and entering the corresponding outlet portion. The first reflecting surfaces preferably make angles of 45 degrees with the planes of the outer sides of the body. The inclination of the second surfaces can vary from element to element since it constitutes or may constitute one of the parameters or the sole parameter denoting the information that is stored in or represented by the respective element. At least one of the reflecting surfaces may be a totally reflecting surface which is formed on a body of synthetic plastic material. Alternatively, the reflectivity of such surfaces can be attributable to the application of thin metallic films to the corresponding zone or zones of the median portion of each light-conducting element.

When the data carrier is inserted into a decoding apparatus, the apparatus directs light against the inlet portions of the light-conducting elements, preferably in a given order (for example, the elements can be disposed in parallel rows extending at right angles to the direction of movement of the data carrier during insertion into such apparatus). The light passes through the elements and that light which issues via outlet portions of the elements is directed against an array of photodiodes which generate corresponding electric signals. Such signals are processed to ascertain the genuineness of the data carrier, the identity of the user and/or to obtain other information.

In accordance with a presently preferred embodiment of the invention, the data carrier has a median layer which defines the median portions of the light-conducting elements and consists at least in part of light-conducting material, and two outer layers which flank the median layer and may be opaque except in the regions of the inlet and outlet portions of the light-conducting elements if the elements are designed in such a way that incident light passes through one outer layer and the light issues through the other outer layer.

The material of the body is preferably deformable in response to the application of heat and/or pressure so as to cancel or invalidate certain light-conducting elements, for example, if each such element denotes a given sum of money, i.e., if the data carrier is used as a substitute for cash. The same result can be achieved by causing chemical changes in those portions of the data carrier which embody selected light-conducting elements, by applying coloring matter to such portions of the data carrier and/or by removing the portions containing selected light-conducting elements. The median layer of the data carrier is formed with cavities adjacent to the light-reflecting surfaces of the median portions of the elements, and such cavities can be eliminated in response to deformation as a result of the application of heat and/or pressure to thereby prevent further passage of light through the thus deformed median portions.

The novel features which are considered as characteristic of the invention are set forth in particular in the appended claims. The improved data carrier itself, however, both as to its construction and the mode of making and using the same, together with additional features and advantages thereof, will be best understood upon perusal of the following detailed description of certain specific embodiments with reference to the accompanying drawing.

BRIEF DESCRIPTION OF THE DRAWING

FIG. 1b is a sectional view as seen in the direction of arrows from the line A—A of FIG. 1a;

FIG. 2a is a fragmentary plan view of a modified data carrier;

FIG. 2b is a sectional view as seen in the direction of arrows from the line B—B of FIG. 2a;

DESCRIPTION OF THE PREFERRED EMBODIMENTS

Figure 1A:
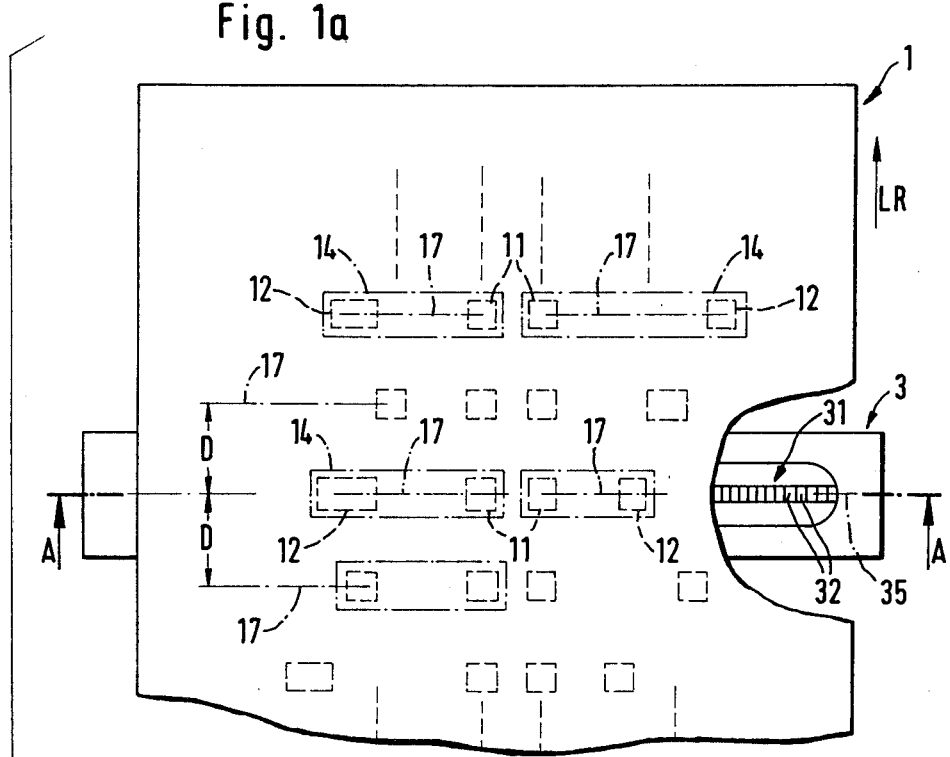
FIG. 1a is a fragmentary plan view of a portion of a data carrier which embodies one form of the invention, further showing a portion of the apparatus for decoding of the information which is borne by the data carrier.
Figure 1B:
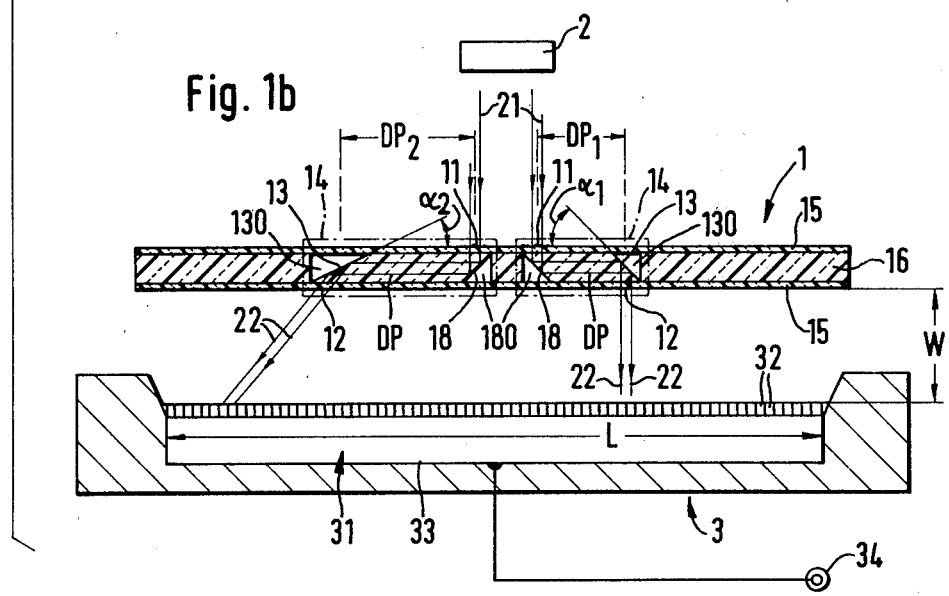

Referring first to FIGS. 1a and 1b, there is shown a card-like data carrier 1 (hereinafter called card) which consists, at least essentially, of synthetic plastic material and may constitute a rectangle having a length of 85 mm, a width of 55 mm and a thickness of 0.7 mm. The card 1 embodies a plurality of discrete light-conducting elements 14 for storage of bits of information. Such elements are distributed over the area of the card 1 so as to form several rows 17 or other types of arrays. Each element 14 has a light-admitting inlet portion 11, a light-conducting median portion DP, and a light-discharging outlet portion 12. Thus, radiation 21 enters an element 14 at 11, it propagates itself in the median portion DP, and leaves the card 1 at 12. The arrangement is such that the median portion DP of each element 14 conveys the admitted light in the plane of the card 1, i.e., in at least substantial parallelism with the planes of the outer sides or surfaces of the card. This means that each inlet portion 11 is offset or staggered with reference to (i.e., out of register with) the corresponding outlet portion 12.

The card 1 of FIGS. 1a and 1b is a flat body which comprises a median layer 16 and two relatively thin outer layers 16 which flank the median layer, i.e., the card 1 is a laminate or sandwich wherein the median layer 16 is confined between the two outer layers 15. The thickness of the median layer 16 constitutes the major part (and normally by far the major part) of the total thickness of the card 1. The three layers or strate can be welded or otherwise bonded to each other, and the median layer 16 is transparent or translucent, at least in the region of the light-conducting median porton DP of each element 14. In other words, radiation 21 which is admitted via inlet portion 11 of an element 14 must be free to propagate itself to the respective outlet portion 12. The radiation 21 may be actinic light, infrared light or any other type of radiation which can be readily detected after it issues from the elements 14.

FIG. 1a shows that each row 17 comprises two neighboring elements 14. When the card 1 is inserted into an automatic deconding apparatus or reader, a light source 2 of such apparatus emits parallel light rays which constitute the radiation 21 and advance in a direction at right angles to the plane of the card 1 (this card is introduced into the apparatus by moving in the direction of the arrow LR shown in FIG. 1a). The median layer 16 of the card 1 is formed with cavities 180 bounded in part by light-reflecting surfaces 18 which make an angle of 45 degrees with the planes of the outer sides of the card, i.e., with the planes of the layers 15, 16, 15. Each of the light-reflecting surfaces 18 is designed for total reflection of incident light, i.e., for reflection of the entire radiation which enters an element 14 via corresponding inlet portion 11 and advances into and through the median portion DP. Therefore, the radiation 21 which is reflected by the surface 18 travels in a direction which is parallel to the planes of the outer layers 15 and such radiation is reflected again by a second reflecting surface 13 in a second cavity 130 of the median layer (i.e., the layer 16 has two cavities, namely, the cavities 180 and 130, for each and every element 14). The length of median portions DP in all of the elements 14 of the card 1 need not and is not the same. This is shown in FIG. 1b which indicates various lengths of the medina portions, as at $DP_1$ and $DP_2$. The surfaces 13 bound portions of the corresponding cavities 130 and effect total reflection of radiation 21 into the corresponding outlet portions 12.

The radiation 22 which issues from the outlet portions 12 of the elements 14 impinges upon and is evaluated by an evaluating device 3 including an array 31 of discrete photodiodes 32, and an electric circuit 33 which receives electric signals from the photodiodes 32 and has an output 34 which transmits a series of impulses for interpretation or deciphering by the apparatus. The loci of impingement of radiation 22 upon the photodiodes 32 of the array 31 depend on the locations of outlet portions 12 (i.e., on the locations of reflecting surfaces 13 and on the length of the corresponding median portions DP) as well as on the inclination of reflecting surfaces 13 relative to the planes of the outer sides of the card 1. The inclination is denoted by the angles alpha. It will be noted that the inclination of the reflecting surfaces 13 is not uniform, i.e., such surfaces make different angles (FIG. 1b shows the angles $alpha_1$ and alpha₂) with reference to the planes of the layers 15 and 16. The length of the median portion DP and the inclination of the reflecting surface 13 of any given element 14 are the two parameters which determine the nature of information that is stored in or represented by the corresponding element 14.

The array 31 of photodiodes 32 preferably forms a single row which registers with successive rows 17 of pairs of elements 14 during insertion of the card 1, i.e., during movement of the card in the direction of arrow LR. The common plane of the axes of the photodiodes 32 is shown at 35. The number of photodiodes 32 in the array 31 may vary within a wide range, for example, such number may equal 64, 128, 256, 512 or 1024. The spacing between the centers of neighboring diodes 32 can also vary within a wide range, e.g., between 0.015 and 0.025 mm. The photocurrents which are generated by the radiation 22 issuing from the elements 14 are transported toward the output 34 of the circuit 33. To this end, the circuit 33 comprises a shift register whose stages transport the incoming signals toward the output 34. The transmission of signals takes place sequentially, i.e., photodiode after photodiode. The series of impulses furnished by the output 34 can be processed to ascertain the genuineness or lack of genuineness of the card 1, the serial number of the card, the identification number of the bearer and/or other information. The plane 35 is normal to the plane of FIG. 1a and is parallel to the rows 17 if the card 1 is properly inserted into and properly advanced in the apparatus including the parts 2 and 3. Thus, the apparatus can decode information which is denoted by successive pairs of elements 14 in response to insertion of the card 1 between the parts 2, 3 and subsequent movement of the card in the direction of the arrow LR. The maximum distance between two neighboring outlet portions 12 in a row 17 must be less than the length L of the array 31. The information which is decoded by the part 3 depends on the aforementioned parameters, namely, the magnitude of the oblique angles alpha (inclination of the reflecting surfaces 13) and the length of the median portions DP of the elements 14.

By way of example, the length of the median portion $DP_1$ may equal 16 unit lengths, and each such unit length may be 0.3 mm. If the minimum number of unit lengths is three and the maximum number of unit lengths is 18, the length of the median portion $DP_1$ can fluctuate between $DP_{1\ min}=1$ mm and $DP_{1\ max}=5.5$ mm. The difference between the minimum and maximum lengths is 4.5 mm and, if the distance between the centers of two neighboring photodiodes 32 in the array 31 is 0.025 mm, a portion of the array 31 whose length matches or approximates 4.5 mm contains approximately 180 photodiodes 31. The resolution of such a large number of photodiodes is amply sufficient to ensure reliable detection of elements 14 regardless of whether the length of the median portion DP of an element 14 is 0.3 mm or a multiple of such distance (e.g., 16 times 0.3 mm).

It will be readily appreciated that a single element 14 can store a four-bit information and that two neighboring elements 14 can store an eight-bit information. The distance W between the array 31 of photodiodes 32 and the adjacent outer side of the card 1 between the parts 2 and 3 should be relatively small, i.e., sufficiently small to ensure that the card need not be produced with an extremely high degree of accuracy (particularly as regards the reflecting surfaces 18 and 13) so that the manufacturing cost would be excessive. In other words, the distance W is sufficiently small to ensure that the card 1 can be mass-produced at a reasonable or acceptable cost in spite of the fact that it is to be formed with a plurality of reflecting surfaces which serve to direct the radiation in predetermined directions.

An important advantage of the improved card is that it can be examined or tested in a very simple apparatus which need not be provided with any complex optical components. Thus, all that counts is to provide a light source (2) and a part 3 which contains an array 31 of photodiodes 32 as well as a circuit 33 which can transport and/or otherwise process the signals which are generated by the photodiodes in response to impingement of radiation 22.

Instead of actinic light, the source 2 can emit infrared light. Also, the reflecting surfaces 13 and/or 18 can be formed by or provided with metallic layers or films which are applied to the corresponding portions of the layer 16 in the card 1.

Counterfeiting of the card 1 is much less likely if the rows 17 of pairs of elements 14 are placed rather close to each other. For example, the distances D between neighboring rows 17 need not exceed 0.7 mm. The provision of cavities 130 (or cavities in the form of slots 19 to be described in connection with FIGS. 2a and 2b) also contributes to difficulty of unauthorized reproduction of the card 1. As a rule, such cavities are formed in a material removing (e.g., milling) machine. The required degree of accuracy of machining of the reflecting surfaces 13 and 18, as well as the required accuracy of orientation or inclination of such surfaces, also contributes to the cost of the card and, therefore, acts as a deterrent to would-be counterfeiters. As a rule, the improved card can be manufactured at a reasonable cost only in specially designed machines. Copying of the card by resorting to two dimensional copying (e.g., photocopying) machines is impossible.

Figure 2B:
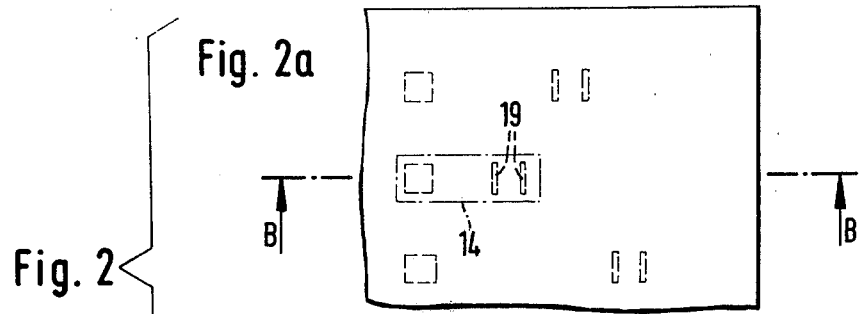
Figure 2B:
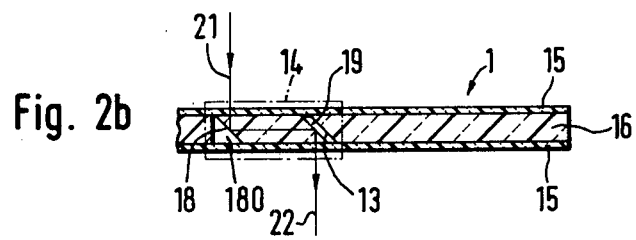

In the card 1' of FIGS. 2a and 2b, the cavity 130 is replaced with a cavity in the form of a narrow slot 19 which is particularly desirable in cards serving as substitutes for cash. In the card 1', each and every element 14' can represent or denote a unit of currency, e.g., one dollar if the entire card 1' constitutes a substitute for a relatively large sum of money (e.g., 100 dollars). The devaluation of card 1' by a desired number of units of currency can be effected by cancelling or destroying or erasing the requisite number of elements 14'. The means for cancelling a certain amount of encoded information may comprise a combined heating and compressing unit 4 having two jaws which are shown in open positions in FIG. 2a and in closed positions in FIG. 3. Closing of the jaws entails heating of the corresponding portion of the card 1' whereby the cavities and/or slots of the element 14' between the closed jaws of the unit 4 disappear and this amounts to eradication of the corresponding unit of currency from the card 1'. The influence of pressure and/or heat upon the reflecting surface 13' of an element 14' may be such that the ability of the surface 13' to reflect light disappears or is diminished in response to heating to a predetermined temperature (by the unit 4) whereby the value of the card 1' (as a substitute for a certain sum of money is reduced accordingly.

Figure 3:
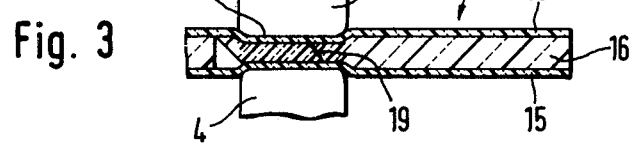
FIG. 3 is a sectional view similar to that of FIG. 2b but showing a portion of the data carrier in deformed condition.

The user of the card 1' will find it desirable to readily recognize the cancelled elements 14', i.e., to rapidly ascertain the remaining value of the card 1'. This can be achieved by selecting the plastic material of the layers 15, 16, 15 of the card 1' in such a way that at least one of these layers undergoes discoloration (change of color) in the region of compression by the jaws of the cancelling unit 4 so that a glance at the card 1' suffices to allow for rough or even reasonably accurate estimation of the value of the remaining elements 14' as substitutes for cash. Discoloration of compressed portion 10 of the card 1' shown in FIG. 3 is indicated by dense hatching. It is also possible to incorporate in the material of the layers of the card 1' one or more chemical substances which are activated in response to the application of heat and/or pressure and cause a readily detectable change in the color of the portion 10. Still further, the unit 4 can be equipped with a source of coloring matter which is applied to the portion 10 so that the visual detectability of cancelled portion or portions 10 need not be attributable to any thermal, mechanical or chemical action but simply to the application of a coat of paint to one or both sides of each cancelled portion 10. Finally, it is equally within the purview of the invention to equip the cancelling unit 4 with a suitable punch which simply removes the selected element or elements 14' from the card 1' by removing the corresponding portions of the three card layers. This also enables the user to immediately ascertain the value of the remaining portion of the card by comparing the combined area of removed portions 10 with the combined area of remaining elements 14'. The removal can take place without any heating and/or compression, i.e., the unit 4 can constitute or can be replaced with a suitable punch for discrete elements 14' or for groups of two or more elements 14', depending on the nature of purchase or payment made by the user of the card 1'.

Figure 4:
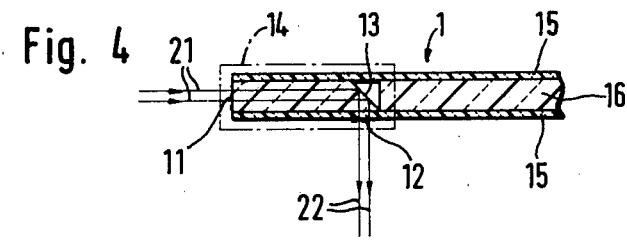
FIG. 4 is a fragmentary sectional view of a third data carrier.

In the card 1" of FIG. 4, the inlet portion 11" of an element 14" is located in the edge face of the card so that the incoming radiation 21" is parallel to the planes of the layers 15 and 16".

Figure 5:
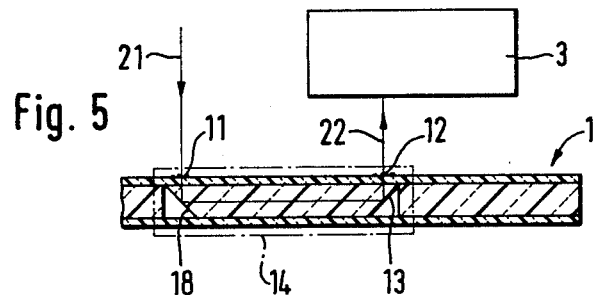
FIG. 5 is a fragmentary sectional view of a fourth data carrier.

FIG. 5 illustrates a further card 101 wherein the inlet portion 111 of each element 114 is located at the same side as the outlet portion 112. Therefore, the part 103 is located at the same side as the source (not shown) of radiation 21.

Figure 6:
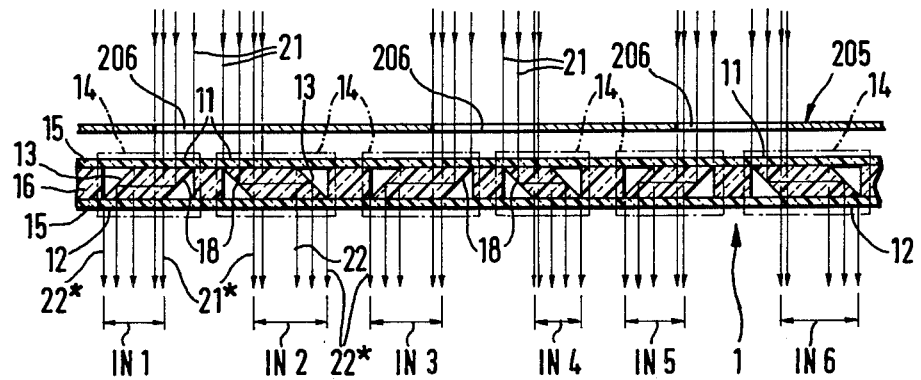
FIG. 6 is a sectional view of a data carrier of the type shown in FIGS. 1a and 1b and further showing a testing device for the data carrier.

FIG. 6 illustrates a portion of a card 1 with a plurality of elements 14 each having an inlet portion 11 and an outlet portion 12. These inlet and outlet portions are disposed in a row corresponding to the rows 17 shown in FIG. 1a. At the card testing station, the card 1 is placed in register with a mask 205 having openings 206 which allow light to enter only in the region of the inlet portions 11. The distribution of openings 206 is such that a small portion of incident light 21 issues at the other side of the card without any deflection. Such light (namely, the small portion of light) is shown at 21* and is bounded by the reflecting surfaces 18 in the median layer 16 of the card 1. The light 22 which issues via outlet portions 12 is bounded by the corresponding reflecting surfaces 13, as at 22*.

The distances $IN_1$, $IN_2$, $IN_3$, $IN_4$, $IN_5$ and $IN_6$ between the outermost rays 21* and 22* correspond to information which is denoted by the respective elements 14. Such distances depend on the positions and inclination of the reflecting surfaces 13 for the associated outlet portions 12. The distances $IN_1$ to $IN_6$ depend solely on the relative positions of two neighboring reflecting surfaces 13 and 18 of the card 1, i.e., not on the absolute positions of such surfaces in the card. Since the distances $IN_1$ to $IN_6$ are quite small (e.g., between 1 and 2 mm), they are accurate even for a plastic card and are not dependent (or depend only negligibly) on fluctuations of the ambient temperature. If the distance between the centers of neighboring photodiodes 32 in the array 31 is 0.025 mm, and if the difference between successive distances $IN_1$, $IN_2$, etc. is 0.1 mm, such difference can be readily discerned by the part 3 of the apparatus shown in FIGS. 1a and 1b. For example, one can select ten different distances IN the shortest of which is 1 mm and the longest of which is 2 mm. Thus, the maximum difference is 1 mm and, divided by ten, the difference between two neighboring distances is 0.1 mm. Each such distance can denote a different decimal number (0 to 9). Thus, each element 14 can contain encoded information denoting a decimal number. If the array 31 contains approximately 1000 photodiodes 32, and if the length (L) of such array is 25 mm, it is possible to place as many as eight elements 14 in a row 17. If the distance D between neighboring rows 17 is 1.5 mm, the card 1 can store or accommodate as many as 400 elements 14 which amounts to storage of 400 decimal numbers. The large amount of information which is stored or storable in the form of 400 discrete decimal numbers can be erased or cancelled step by step, i.e., each and every element 14 of such information can be cancelled independently of the remaining elements. Cancellation can involve deformation in a manner as described in connection with FIG. 3, discoloration (change of color) as a result of compression, heating, chemical action and/or painting, and/or bodily removal or cutting out of the corresponding portions of the card.

It will be readily appreciated that unauthorized manufacture of cards which embody the present invention is extremely difficult, expensive and risky because a counterfeit card can be readily detected by the equipment which is used for reading of information on genuine cards. The reason for such problems which are encountered by a would-be counterfeiter is that the information is stored and encoded in three dimensional form as well as that the positions and the configuration of elements 14 must be selected with a very high degree of precision. This applies for the distribution of elements in a group as well as for the inclination of reflecting surfaces forming part of such elements.

The three important advantages of the improved card include the absence of likelihood of convenient counterfeiting (i.e., the difficult and great cost of making such cards by unauthorized persons without risking immediate detection). The difficulty of unauthorized reproduction is especially pronounced if the information is stored in threedimensional form and if the distribution and/or orientation of the elements is selected with the aforediscussed high degree of accuracy. The second important advantage of the improved card is that selected bits of encoded information can be erased or cancelled in a very simple, time-saving and inexpensive way. Moreover, the eradication of information is irreversible, i.e., one or more selected groups of elements can be destroyed or eliminated without the possibility of restoring them by unauthorized persons. The third important advantage of the improved card is that it can store substantial amounts of information. This third feature renders it possible to use the improved card in a number of different ways and for a number of different purposes including the following:

(A) Exclusively as a substitute for currency (cash). Thus, each and every group of elements can represent a certain sum of money and the selected group or groups can be cancelled or removed by the application of heat and/or pressure and/or by cutting them out of the remaining part of the card.

(B) For the sole purpose of identification. For example, a first set of groups of elements can denote a given number which differs from card to card (i.e., it can constitute the serial number of the card). A second set of groups of elements denotes a different type of information or identification which also varies from card to card. Such information can be furnished by an encoding calculator during making of the cards by taking into consideration the serial number of the card as well as a secret code. When the card is examined, the examining apparatus contains a similar encoding calculator as well as the secret code so that the apparatus can readily ascertain the presence or lack of corresponding between the serial number and the remaining information on a given card.

(C) As a combination of a cash substitute card and an identification card. For example, such a combination card can be issued by department stores or money lending or handling institutions as a means for paying instead of cash whereby the payment with the card is charged to the account of the owner or user of the card.

(D) As a card which stores information pertaining to the time of the day and/or additional time-denoting data. The card can be inserted into a clock or a like apparatus which destroys one or more groups of elements denoting a given time of the day, a given day of the week or month or a combination of such data. The elements can be readily grouped in such a way that they can denote a large number of different times of the day, days of the week, weeks of the year and/or a combination of such data.

Figure 7:
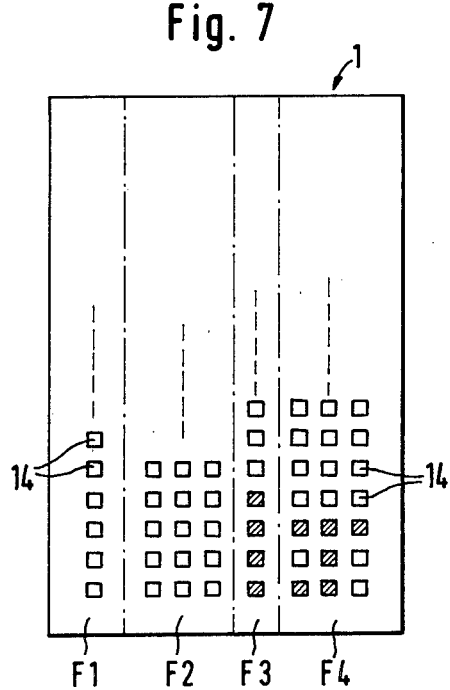
FIG. 7 is a schematic plan view of a fifth data carrier.

(E) As a combination of money substitute card, identification card and time recording card. Such a combination card can be provided with several sets of groups of light-conducting elements, one set for each category of encoded information. As shown in FIG. 7, a first field $F_1$ of the card 201 can accommodate elements 214 which denote the serial number of the card 201, a second field $F_2$ can accommodate elements 214 denoting data which identify the owner or user of the card in addition to identification via serial number, a third field $F_3$ contains encoded information denoting a certain sum of money, and a fourth field $F_4$ contains information pertaining to times of the day, days of the week, etc. The erased or cancelled elements 214 in the card 201 of FIG. 7 are denoted by hatching. Each of the non-erased elements 214 shown in FIG. 7 denotes a discrete decimal number in encoded form.

Figure 8:
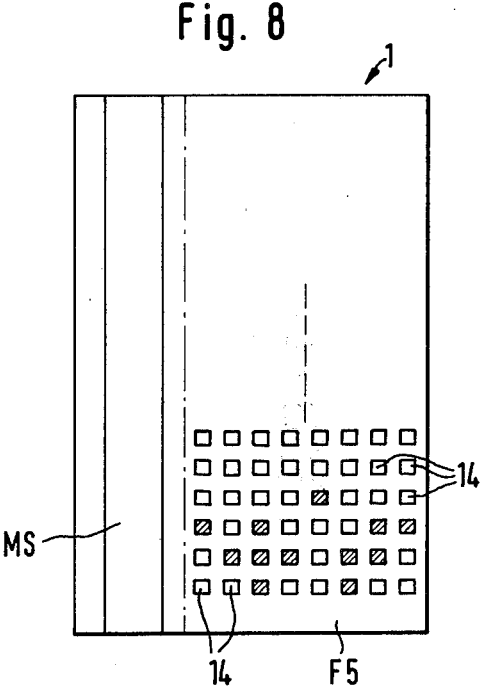
FIG. 8 is a schematic plan view of a sixth data carrier.

The aforediscussed advantageous features of the improved card (namely, difficulty of falsification, ready cancellability of the elements and great capacity, i.e., the ability to store large amounts of adequately encoded information which can be readily decoded by an automatic reader) render it possible to construct the card in such a way that a first part or section thereof bears encoded information in the form of properly distributed and oriented elements and a second part or section of the card bears an entirely different type of information, e.g., in the form of data encoded on a magnetic track MS shown on the card 301 of FIG. 8. The part or section $F_5$ bears information in the form of elements 314. The track MS serves as a means for repeatedly storing selected information, for example, for storage of data denoting different amounts of money and/or data denoting various units of time or various times of the day, week, month, etc. In each instance, the card 301 should be designed with a view to reduce the probability of falsification or counterfeiting, a feature which cannot be readily achieved if the entire information is to be stored on one or more magnetic tracks. The provision of the part or section $F_5$ in addition to the track or tracks MS of FIG. 8 renders it much less likely that the card 301 would be produced by unauthorized persons. Moreover, the section $F_5$ renders it possible to rapidly ascertain the genuineness of the card 301.

Let it be assumed that the card 301 of FIG. 8 serves as a substitute for cash. The genuineness or lack of genuineness of such card can be readily ascertained by proceeding in a manner as outlined above, i.e., by decoding the information on the part or section $F_5$, i.e., by decoding the information which is stored in the form of elements 314. The information which is encoded in the form of elements 314 may include data denoting the serial number of the card 301 as well as other indicia or data identifying the bearer or user of the card in addition to identification by the serial number. The sum of money is magnetically recorded on the track or tracks MS at a suitable station in properly encoded form, e.g., by resorting to a coding and/or decoding device of any known design. For the purpose of encoding, the information denoting a secret code as well as the momentary information furnished on decoding of data denoted by the elements 314 is supplied to the encoding computer. In the course of each devaluing or cancelling operation, the cancelling machine irreversibly erases or cancels one or more elements 314 in the part or section $F_5$. This automatically entails an irreversible alteration of the mode of encoding. Without such alteration of the encoding mode, the information which is stored on the tape MS could be transferred onto a magnetic recording band prior to cancellation of the amount represented by such information. The card would be thereupon used to pay a debt with attendant cancellation of the amount which is denoted by the information on the tape MS, and the information denoting the full amount of cash would be transferred back from the tape onto the track MS so that the card 301 could be reused for fraudulent purposes. The lack of knowledge of the secret code would be of no consequence. In other words, a forger could reinstate the original full amount on the track MS as often as desired. However, and since the information which is denoted by the elements 314 in the part or section $F_5$ is used for introduction into the computer to serve as an auxiliary to encoding of the magnetically recorded amount of money as well as for subsequent decoding of information which is stored on the track MS, and since the information which is denoted by the elements 314 changes in response to each cancellation of a portion of information borne by the track MS, forging of the card 301 is practically impossible. Thus, when the information on the track MS is decoded for the first time, such decoding is preceded by or takes place simultaneously with decoding of the entire information on the section or part $F_5$ of the card 301. The next step of decoding magnetically recorded information necessitates the availability of information which is stored in the form of remaining (uncancelled) elements 314, and so forth. In other words, the information which is needed to alter the amount of money denoted by the magnetically recorded information varies from cancellation to cancellation by reducing the number of uncancelled elements 314.

It will be noted that, by the simple expedient of using the part or section F₅ in addition to the magnetic track or tracks MS, the information which is encoded on the track cannot be readily decoded without resorting to equipment whose efficiency is dependent on the knowledge of the secret code which is necessary to interpret and alter the magnetically recorded information.

The cancelled or erased elements 314 in the part or section F₅ of the card 301 shown in FIG. 8 are denoted by hatching. Each of the non-erased or uncancelled elements 314 is assumed to denote a decimal number.

If desired, the data carrier of the present invention may resemble a key for convenient insertion into a decoding, cancelling or like apparatus. The data bearing portion may constitute the key bit.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A data carrier for storage of encoded machine-readable information such as amounts of money, various times and/or identifying indicia, comprising a flat card-like body and a plurality of light-conducting elements in said body, each of said elements denoting a bit of information and each having a light-admitting inlet portion, a light-discharging outlet portion offset with reference to said inlet portion, and a light-reflecting and conducting median portion intermediate said inlet and outlet portions, said median portion being arranged to conduct light from said inlet portion to said outlet portion.

2. The data carrier of claim 1, wherein said median portion of each of said elements has at least one light reflecting surface.

3. The data carrier of claim 2, wherein the distance between the inlet and outlet portion of each of said elements is indicative of the bit of information which is denoted by the respective element.

4. The data carrier of claim 3, wherein said body has substantially parallel outer surfaces and said reflecting surfaces are inclined with reference to said outer surfaces, the inclination of said reflecting surfaces relative to such outer surfaces being indicative of the bit of information denoted by the respective elements.

5. The data carrier of claim 1, wherein each of said median portions has a first reflecting surface which reflects light entering through the inlet portion of the respective element and a second reflecting surface which reflects light leaving the respective median portion, said body having substantially parallel outer surfaces and said first reflecting surfaces making angles of approximately 45 degrees with said outer surfaces.

6. The data carrier of claim 1, wherein at least those portions of said body which define said median portions consist of synthetic plastic material and each of said median portions has at least one totally reflecting surface disposed in the path of light entering via corresponding inlet portion and propagating itself toward the associated outlet portion.

7. The data carrier of claim 1, wherein each of said median portions includes a reflecting surface disposed intermediate the inlet portion and outlet portion of the respective element, each of said surfaces having a film of metallic material.

8. The data carrier of claim 1 for insertion into a decoding apparatus wherein the carrier advances in a predetermined direction, said elements forming a plurality of parallel rows extending at right angles to said predetermined direction.

9. The data carrier of claim 8, wherein the inlet and outlet portions of any given element are disposed in a common row.

10. The data carrier of claim 1, wherein said body comprises a median layer which defines said median portions and two outer layers flanking said median layer.

11. The data carrier of claim 10, wherein said median layer consists, at least in part, of light-conducting material.

12. The data carrier of claim 1, wherein each of said median portions has a light reflecting surface adjacent to the respective outlet portion and said body has two outer surfaces making oblique angles with said reflecting surfaces, said body further having a narrow slot adjacent to each of said reflecting surfaces.

13. The data carrier of claim 12, wherein said reflecting surface is a totally light reflecting surface.

14. The data carrier of claim 1, wherein said body consists of a material which is deformable in response to the application of heat and/or pressure to thereby allow for cancellation of any selected element.

15. The data carrier of claim 14, wherein each of said median portions has at least one light reflecting surface and a cavity adjacent to the respective reflecting surface, the deformability of said body in response to the application of heat and/or pressure entailing the elimination of said cavity in the respective median portion.

16. The data carrier of claim 1 for use in decoding apparatus having an array consisting of photodiodes and having a predetermined length, said elements forming a plurality of rows and the distance between the outlet portions of two neighboring elements in a row being less than said predetermined length.

17. The data carrier of claim 1, wherein said body includes a first field having a first set of said elements which denote a first type of information and at least one second field having a second set of said elements denoting a second type of information which is related to said first information.

18. The data carrier of claim 17, wherein said first type of information is a serial number and said second type of information is a different number bearing a predetermined relationship to said serial number.

19. The data carrier of claim 1, wherein said elements include a set of elements wherein each element denotes a given amount of money.

20. The data carrier of claim 1, wherein said elements include a set of elements wherein each element denotes a given unit or increment of time.

21. The data carrier of claim 1, wherein said body includes a first field with elements denoting the serial number of the data carrier, a second field with elements denoting the identification number of the bearer, said identification number being related to said serial number, a third field with elements denoting predetermined sums of money, and a fourth field with elements denoting predetermined units or increments of time.

22. The data carrier of claim 1, wherein said body includes a first section provided with said elements and a second section having magnetic means for storage of information.

23. The data carrier of claim 22, wherein said second section has at least one magnetic track.

24. The data carrier of claim 22, wherein the information stored in said second section of said body denotes various sums of money.

* * * * *